Oct. 26, 1965    T. MOLLINGA    3,214,608
VOLTAGE LEVEL SENSING CIRCUIT
Filed Nov. 19, 1962
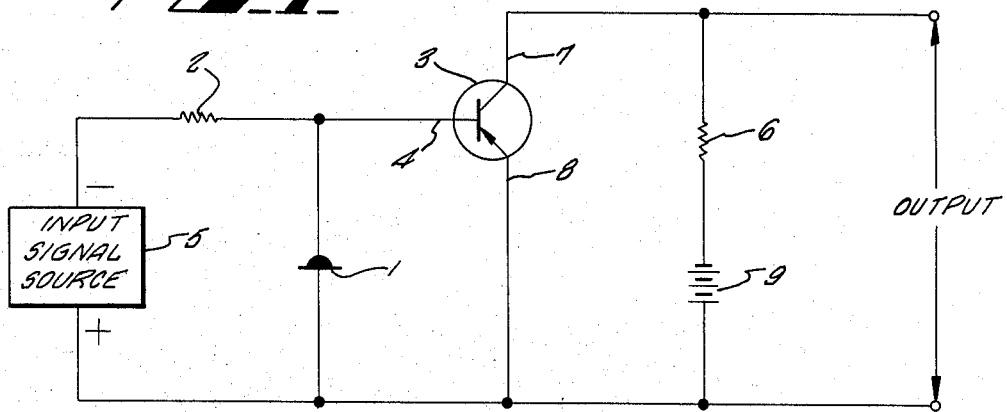
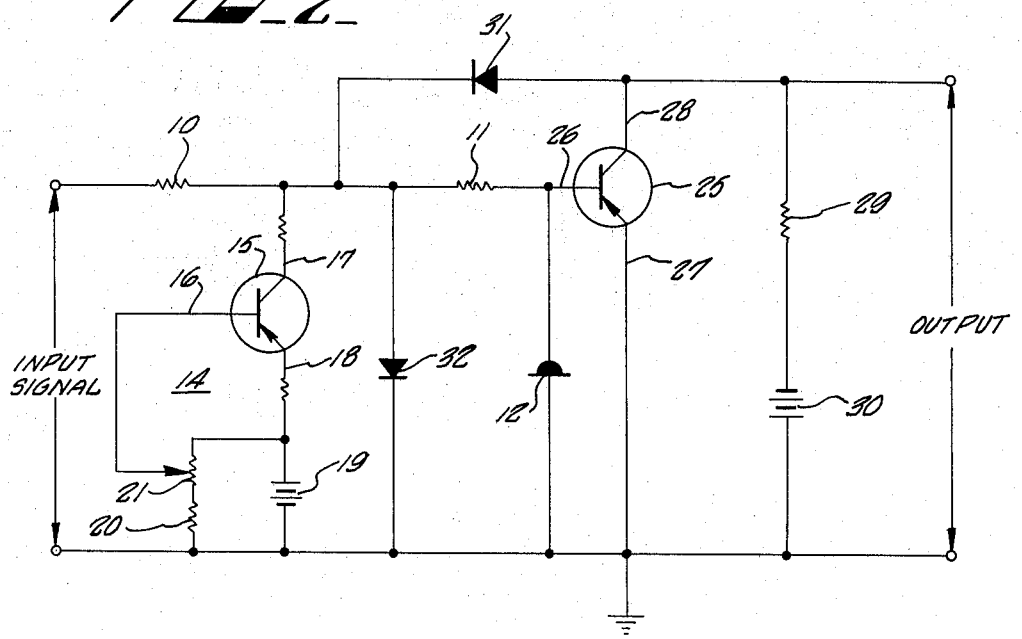
INVENTOR.
THOMAS MOLLINGA
BY
Christie, Parker & Hale
ATTORNEYS.

United States Patent Office 3,214,608
Patented Oct. 26, 1965

3,214,608
VOLTAGE LEVEL SENSING CIRCUIT
Thomas Mollinga, Sierra Madre, Calif., assignor to Burroughs Corporation, Detroit, Mich., a corporation of Michigan
Filed Nov. 19, 1962, Ser. No. 238,610
5 Claims. (Cl. 307—88.5)

This invention relates to circuitry for sensing voltage levels and it is particularly useful in systems which require voltage sensing devices that are selectively responsive to a plurality of input voltage levels, have fixed output levels and have a well-defined resolution.

Circuits that are designed to sense voltage levels may be grouped into two general categories. One category includes voltage selection circuits or clipping circuits, which are designed to transmit a signal without distortion after the input signal has attained a fixed reference level. The other type of voltage sensing circuit is termed a voltage comparator and is designed primarily to sense a voltage level at its input and does not, in any way, attempt to reproduce any part of the signal wave form.

Voltage level sensing circuits, and, in particular, voltage comparators are very useful in a number of systems. For example, they are useful in radar systems where it is necessary to provide time markers. Voltage comparators are here advantageously employed to furnish time markers when the input voltage is a linear saw-tooth of a known slope. Another useful application of voltage comparators is in time markers where the input signal is a sine wave. Other uses for voltage comparators may be found on pages 458 through 484 of the book "Pulse and Digital Circuits" by Millman and Taub, McGraw Hill, 1956.

Some additional uses of voltage comparators are single and multi-channel pulse analyzers in nuclear physics measurements, automatic test equipment and in spectrometry counting experiments. Voltage comparators are particularly useful when it is desired to exclude unwanted noise or other small pulses from signals being counted.

Many circuits have been employed in the past as voltage comparators. Typical of these is the differential amplifier wherein a pair of active elements is employed to detect differences in the input signal with respect to a reference voltage. However, a disadvantage of such differential amplifiers is that they require matched devices for the active elements in order to provide accurate performance. Additionally, the positioning of the elements is critical so that temperature variations will affect them equally.

Another common circuit used as a voltage comparator is the Schmitt-trigger. The Schmitt-trigger also has its disadvantages as a voltage comparator. When the circuit has to operate over a certain range, the adjustment of the reference voltage changes the operating levels of the circuit with a resultant change in the output levels. The change in output levels is particularly harmful when the voltage comparator is employed to change an analog signal into digital form to be applied to logic circuitry in a computer. The majority of the logic circuitry will not function properly if its input signal does not have fixed limits.

Other circuits that have been employed as voltage comparators utilize a feedback loop between the output and the input and have a tendency to oscillate, thus making them unsuitable for many applications.

Thus, it is desirable to have a voltage comparator comprising as simple a circuit as possible which will detect selected voltage levels without the disadvantages enumerated in connection with the prior art voltage comparators. In particular, it is desirable to have a voltage comparator that does not require matched elements and does not involve critical positioning; but does have a similar response for all frequencies and has a well-defined resolution to provide positive detection.

Therefore, in accordance with the invention, there is provided a voltage level sensing circuit which has the above desirable characteristics. The circuit comprises a bistable regenerative device (having a negative resistance characteristic and two states of operation) connected in series with a resistive element. The bistable device supplies the reference with which the input voltage level is compared when the input signal is applied to the series combination. The circuit further comprises an output circuit connected across the regenerative device, which will have an output signal upon the changing of the state of operation of the regenerative device when the input voltage reaches a certain level.

It is additionally desirable to make the voltage comparator responsive to a plurality of input signal levels without adversely affecting the resolution of the comparator and without changing the fixed levels of the output signal. It is further desirable to provide a means for making the detection level variable or for varying the reference point without introducing error into the circuit operation.

Therefore, in accordance with the invention, the voltage comparator further comprises a second resistive element connected in series with the series combination of the bistable regenerative device and the first resistive element. A variable current source is thereafter connected to the junction point of the resistive elements to control the point of switching of the bistable element. The current source has a very high impedance and does not load the circuit when it is connected. Additionally, the current source may be direct-current controlled so that the means for adjusting the current may be remote. Further, in order not to damage the bistable regenerative element by excessive reverse current, a diode is connected between the junction point of the resistive elements and one side of the regenerative element to act as a bypass for any reverse current.

The above and other features and advantages of the present invention will be more clearly and fully understood upon consideration of the following specification and drawing in which:

FIG. 1 is a schematic diagram of a voltage comparator, in accordance with the invention; and FIG. 2 is a schematic diagram of a preferred embodiment of a voltage comparator for detecting a plurality of selectable voltage levels, in accordance with the invention.

The voltage comparator of FIG. 1 comprises a tunnel diode 1 connected in series with a resistor 2. Tunnel diodes are bistable regenerative devices that have a negative resistance characteristic and may be operated in two distinct states. The two states are a high current, low voltage state and a low current, high voltage state. As the current flowing through the diode is increased from zero, the diode will switch from a high current, low voltage state to a low current, high voltage state. The point at which this switching action takes place is determined by the peak point current of the individual tunnel diode. Therefore, by selecting a tunnel diode having a certain peak point current and connecting a resistor having a selected value in series with it, the input voltage, which will cause the tunnel diode to switch, is determined. Thus, a reference point about which a particular input voltage level will be detected is established. The reference is directly dependent upon the peak point current of the tunnel diode. This results in a very desirable reference, since the peak point current is not temperature sensitive and is very stable. However, the input voltage level required for switching a certain tunnel diode may thereafter be varied by varying the value of the series resistor.

In FIG. 1, an input signal from a source 5 is applied to the series combination of a constant value resistor 2 and tunnel diode 1. When the input voltage level is of sufficient magnitude and of the polarity shown, the resultant current flow through the tunnel diode will cause the diode to switch to its high voltage, low current state. The switching of tunnel diode 1 is detected by a transistor 3 which acts as a buffer amplifier between the tunnel diode 1 and the output circuit. The switching of tunnel diode 1 causes base 4 of transistor 3 to become sufficiently negative with respect to emitter 8 to turn transistor 3 on. Current will then flow through the emitter-collector path of the transistor and through a resistor 6 to a source of energy 9. The conduction of current through resistor 6 will produce an output signal.

As noted above, the input voltage level required for the switching of the diode may be varied by changing the constant value resistor to a variable resistor. However, the employment of a variable resistor in series with the tunnel diode to vary the detection level of the voltage comparator has attendant disadvantages. For example, when the input current flows through a variable resistor, the capacity of the wiring and of the variable resistor will induce an unwanted distortion and will possibly delay the signal which is very detrimental when the input signal has a high frequency. Therefore, it is desirable to provide a different means for adjusting the detection level or the input voltage level which will cause the tunnel diode to switch from one state to another. A preferred embodiment of a voltage comparator having an adjustable switching point, so that it may detect a plurality of selectable voltage levels, is shown in FIG. 2.

The resistor that is in series with the bistable regenerative device of FIG. 1 is split into 2 separate resistive elements, which are shown in FIG. 2 as resistor 10 and resistor 11. In order to make the series combination of resistors 10 and 11 and tunnel diode 12 responsive to a plurality of input voltage levels, there is provided a current generator 14, which is connected to the junction of resistors 10 and 11 and acts as a direct-current bleeder. The current generator 14 is connected in parallel with the series combination of resistor 11 and tunnel diode 12. The parallel combination is then connected through resistor 10 to the input signal. The magnitude of current flowing through the diode for any particular input voltage may thereafter be controlled by varying the magnitude of the current from the input signal that is shunted through the current generator and away from the tunnel diode. Thus, the input voltage level, which will cause the diode to switch, is selectable by controlling the current through generator 14.

Current generator 14 includes a transistor 15 as an active element. The transistor has a base 16, collector 17, and an emitter 18. The current through transistor 15 is controlled by the bias voltage applied to the base 16 of the transistor. The bias voltage is supplied by a source 19 through a voltage divider circuit comprising a resistor 20 and a potentiometer 21. The bias supplied to transistor 15 may be varied by adjusting the wiper arm of potentiometer 21. As the base 16 is made more negative with respect to the emitter 18, the transistor will conduct more current, thereby bleeding more current away from the diode and requiring the input voltage level to be higher to switch the diode.

The employment of a current generator to make the detection level variable has two main advantages. First, the output impedance of the current generator 14 is extremely high so that the junction of resistors 10 and 11 is not loaded. Thus, the signal at this junction is not affected by the current generator.

The second advantage is that the current generator 14 is strictly direct-current operated so that the means for adjusting the detection level of the comparator may be remote without introducing distortion or delay.

A transistor 25 is again provided as a buffer amplifier between the output circuit and the tunnel diode 12. The base 26 and emitter 27 of transistor 25 are connected directly across the tunnel diode 12 so that the conduction of transistor 25 is directly dependent upon the magnitude of voltage across the tunnel diode 12. The collector 28 of transistor 25 is connected through a resistor 29 to a negative source 30. When the voltage between the base and emitter is sufficiently negative, transistor 25 will conduct current through its emitter-collector path to the negative source 30 through resistor 29. The conduction of current through resistor 29 will produce an output signal.

A diode 31 is connected between the collector 28 of transistor 25 and the junction point of resistors 10 and 11 to prevent excessive saturation of transistor 25 which would cause delay in switching. Thereafter, upon the switching of the diode and the turning on of the transistor, any increase in magnitude of the input signal beyond the point required for the switching of tunnel diode 12, will not cause the transistor 25 to be driven further into saturation. On the contrary, when transistor 25 conducts, the collector 28 will have a potential substantially equal to the potential on the emitter 27. Thus, if emitter 27 is connected to ground, this ground will appear at the collector 28. The appearance of ground at collector 28 will forward bias diode 31 to effectively clamp the junction of resistors 10 and 11 at a fixed potential. Thereafter, the current through resistor 11 will remain constant and transistor 25 will not be driven further into saturation.

When the input voltage at the input teminals is zero and the current generator 14 is turned on, a positive voltage will appear att he junction of resistors 10 and 11. If the current through the generator 14 is of sufficient magnitude, the positive voltage at the junction will cause current to flow through the resistor 11 and the tunnel diode, 12 in the reverse direction. To prevent this reverse current from flowing, a diode 32 is connected between ground and the junction of resistors 10 and 11. This diode 32 presents a low impedance path in parallel with the series combination of resistor 11 and diode 12 and will prevent excessive reverse current through the series combination.

What is claimed is:

1. A device for sensing a plurality of selectable magnitudes of voltage comprising an input circuit including a series combination of a first resistor, a second resistor, and a tunnel diode, the first and second resistors connected together at a common junction, a variable constant current generator connected to the junction and across the second resistor and tunnel diode as a current bleeder circuit, a semi-conductor switch, the control elements of the switch being connected across the tunnel diode, and an output circuit responsive to the switch.

2. A voltage level sensing circuit for selectively detecting variable magnitudes of input voltage comprising a bistable device, means for connecting the voltage to be detected across the bistable device to thereby cause a current corresponding to said voltage to flow in the bistable device, a direct-current controlled means for shunting selectable magnitudes of said current around the bistable device, the shunting means being connected across the bistable device as a current bleeder circuit, and an output circuit connected in parallel with the bistable device.

3. A voltage level sensing circuit for selectively detecting variable magnitudes of input voltage comprising a bistable device, means for connecting the voltage to be detected across the bistable device, a direct-current controlled means for shunting selectable magnitudes of current around the bistable device, the shunting means being connected across the bistable device as a current bleeder circuit, and a transistor switch having an input circuit and an output circuit, the input circuit of the transistor switch being connected in parallel with the bistable device whereby the transistor switch is responsive to the voltage across the bistable device.

4. A voltage level sensing circuit for selectively detecting variable magnitudes of input voltage comprising a bistable device, means for connecting the voltage to be detected across the bistable device, a direct-current controlled means for shunting selectable magnitudes of current around the bistable device, the shunting means being connected across the bistable device as a current bleeder circuit, a transistor switch having an input circuit and an output circuit, the input circuit of the transistor switch being connected in parallel with the bistable device whereby the transistor switch is responsive to the voltage across the bistable device, and means for limiting the magnitude of the current through the transistor switch to a predetermined value, the limiting means being connected between the output circuit of the transistor switch and the bistable device.

5. A voltage level sensing circuit for selectively detecting variable magnitudes of input voltage comprising a bistable device, means for connecting the voltage to be detected to the bistable device, a direct-current controlled means for shunting selectable magnitudes of current around the bistable device, the shunting means being connected across the bistable device as a variable current bypass circuit, means responsive to the voltage across the bistable device for closing a circuit to produce an output signal when an input signal to the bistable device exceeds a predetermined voltage, and means for bypassing any current flowing in the direction opposite to the normal current through the bistable device, the bypassing means being connected across the bistable device.

References Cited by the Examiner
UNITED STATES PATENTS

| | | | |
|---|---|---|---|
| 3,094,630 | 6/63 | Rapp | 307—88.5 |
| 3,101,406 | 8/63 | Engelmann | 328—127 |
| 3,108,229 | 10/63 | Herzog | 307—88.5 |

OTHER REFERENCES

Haddon et al.: IBM Technical Disclosure Bulletin, vol. 2, No. 5, February 1960, pages 53 and 54.

Hemel: "A Study of Tunnel Diodes for Digital Electronic Circuits," Solid State Design, March 1962, pages 31 to 38.

JOHN W. HUCKERT, *Primary Examiner.*

ARTHUR GAUSS, *Examiner.*